United States Patent Office 3,755,510
Patented Aug. 28, 1973

3,755,510
O OR S ARYL-N,N',N'' HEXAALKYL PHOSPHONIUM SALTS AND THEIR METHOD OF PREPARATION
David Cheong King Chan, San Francisco, Calif., assignor to Chevron Research Company, San Francisco, Calif.
No Drawing. Filed Dec. 21, 1970, Ser. No. 100,415
Int. Cl. A01n 9/36; C07f 9/54
U.S. Cl. 260—959    19 Claims

ABSTRACT OF THE DISCLOSURE

Compounds of the formula

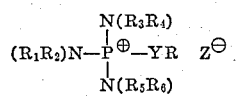

wherein $R_1$, $R_2$, $R_3$, $R_4$, $R_5$ and $R_6$ are individually alkyl of 1 to 6 carbon atoms or cycloalkyl of 3 to 6 carbon atoms with the proviso that $R_1$, $R_2$, or $R_3$, $R_4$, or $R_5$, $R_6$ may be joined to form a linear alkylene radical of 4 to 6 carbon atoms which is bound to the nitrogen to form a ring, and with the further proviso that when both groups attached to any amido nitrogen are alkyl, then at least one of said alkyl groups must have a primary attachment, Y is oxygen or sulfur, R is an aryl group of 6 to 10 carbon atoms optionally substituted with halogen atoms, nitro groups, alkyl groups or alkoxy groups and Z represents a halogen-containing anion. The compounds find use as pesticides, particularly herbicides, defoliants and fungicides.

BACKGROUND OF THE INVENTION

Field

The present invention is directed to hexaalkyltriamido aryloxy- and arylthio-phosphonium halides. These phosphonium compounds find use as pesticides, particularly herbicides, defoliants and fungicides.

Prior art

U.S. Pat. 3,433,623 discloses phosphoric triamide derivatives and their use as herbicides. U.S. Pat. 3,074,993 discloses phosphorotriamidohalidothioates in which the radical attached to the sulfur is lower alkyl, allyl or benzyl. The compounds disclosed are useful in the control of parasites and plants.

SUMMARY OF THE INVENTION

A new class of compounds has now been discovered, namely the hexaalkyltriamido aryloxy- and arylthio-phosphonium halides. The method of preparation of the subject compounds is also new. The compounds find use as herbicides, defoliants and fungicides.

DESCRIPTION OF THE INVENTION

Compounds of the present invention may be represented by the general formula

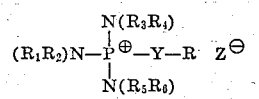

wherein $R_1$, $R_2$, $R_3$, $R_4$, $R_5$ and $R_6$ are individually alkyl of 1 to 6 carbon atoms, cycloalkyl of 3 to 6 carbon atoms with the proviso that $R_1$, $R_2$ or $R_3$, $R_4$, or $R_5$, $R_6$ may be joined to form a linear alkylene radical of 4 to 6 carbon atoms which is bound to the nitrogen to form a ring; and with the further proviso that when both groups attached to any amido nitrogen are alkyl at least one of said alkyl groups must have a primary attachment; Y is oxygen or sulfur; R is aryl of 6 to 10 carbon atoms substituted with 0 to 5 halogen atoms of atomic number 9 to 35 (fluorine, chlorine or bromine), alkyl groups individually of 1 to 4 carbon atoms, alkoxy groups individually of 1 to 4 carbon atoms or nitro groups and Z is an anion containing a halogen atom of atomic number 17 to 53, preferably hydrogen dihalide anion such as hydrogen dichloride, hydrogen dibromide or hydrogen diiodide.

$R_1$, $R_2$, $R_3$, $R_4$, $R_5$ and $R_6$ may be the same or different. Preferably they will be the same. Representative groups which $R_1$ through $R_6$ may represent include methyl, ethyl, n-propyl, n-butyl, i-butyl, n-pentyl, n-hexyl, cyclopentyl, cyclohexyl. Preferably $R_1$ through $R_6$ will be alkyl groups of 1 to 4 carbon atoms. When used as fungicides it is particularly preferred that $R_1$ through $R_6$ be alkyl of 3 to 6 carbon atoms, preferably 3 to 4 carbon atoms.

When both groups attached to the amido nitrogen are alkyl groups (as opposed to cycloalkyl groups), at least one of the alkyl groups on said amido nitrogen must have primary attachment to the nitrogen. The other alkyl group may have primary, secondary or tertiary attachment. The terms primary, secondary and tertiary attachment refer to the structuure of the carbon attached directly to the nitrogen. Thus stated another way, when $R_1$, $R_2$, or $R_3$, $R_4$, or $R_5$, $R_6$, are both alkyl, then only one of $R_1$, $R_2$, or $R_3$, $R_4$, or $R_5$, $R_6$, may have secondary or tertiary attachment to the amido nitrogen. When one of the groups attached to an amido nitrogen is cycloalkyl, the other group may be alkyl or cycloalkyl and, if alkyl, the group may be primary, secondary or tertiary.

While R in the above formula may be phenyl or naphthyl or substituted phenyl or naphthyl, it is preferred that R be phenyl or substituted phenyl. Thus R is preferably phenyl or phenyl substituted with 1 to 5 halogen atoms of atomic number 9 to 35, alkyl groups of 1 to 4 carbon atoms, alkoxy groups of 1 to 4 carbon atoms or nitro groups. Preferably the total number of substituents on the phenyl group will not exceed 3. Thus representative R groups include 2 - chlorophenyl, 3 - chlorophenyl, 4-chlorophenyl, 2,4 - dichlorophenyl, 3 - methylphenyl, 4-methoxyphenyl, 2-chloro-4-nitrophenyl, 2,6-difluorophenyl, 2,5-dichlorophenyl, 2-chloro-5-bromophenyl, 4-butoxyphenyl, 3-phenoxyphenyl, 4-nitrophenyl, etc.

Representative compounds for the present invention are hexamethyltriamido phenoxy phosphonium hydrogen dibromide, hexamethyltriamido 2-chlorophenoxy phosphonium chloride, hexaethyltriamido phenoxy phosphonium hydrogen dichloride, hexaethyltriamido 4-methoxyphenoxy phosphonium bromide, hexa-n-propyltriamido - 2-chlorophenoxy phosphonium hydrogen diiodide, hexaalkyltriamido 4-nitrophenoxy phosphonium iodide, N-dimethyl-N' - diethyl-N''-di-n-propyltriamido 2-methylphenoxy hydrogen dibromide, N-methylethyl-N'-i-propyl-n-butyl-N''-n-pentyl-n-hexyltriamido 2-naphthyloxy phosphonium hydrogen dichloride, N-dimethyl-N'-diethyl-N''-methylcyclohexyltriamido 3-methoxyphenoxy phosphonium hydrogen dibromide, N,N',N''-tripiperidido 3-t-butylphenoxy phosphonium hydrogen dibromide, N,N',N'' - tripyrrolidido pentachlorophenylthio phosphonium hydrogen dichloride, N - diethyl-N'-dicyclopentyl-N''-dicyclohexyltriamido 2,4-dichloro-5-ethylphenylthio phosphonium hydrogen dibromide, hexahexyltriamido phenylthio phosphonium hydrogen diiodide.

The compounds of this invention are prepared by reacting a phenol or thiophenol with a triamido halophosphonium halide according to the following equation:

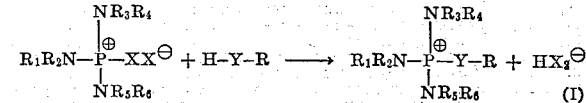

wherein R, $R_1$, $R_2$, $R_3$, $R_4$, $R_5$, $R_6$, and Y all have the same meaning as before, and X is halide. In the preferred method of operation the phenol or thiophenol dissolved in a solvent is added to a molar equivalent of the triamido halophosphonium halide also dissolved in an inert solvent, preferably a low boiling chlorinated hydrocarbon such as methylene chloride or chloroform. The quantity of solvent varies from about 10 to 100 times by weight of the phosphonium halide. A major portion of this amount of solvent is used to dissolve the phosphonium halide, whereas a minor portion is used to dissolve the phenol or thiophenol compound. The reaction is carried out at temperatures in the range of from 0° C. to the reflux temperature of the reaction mixture, about 40° C. Under these conditions the reaction is usually complete within 2 to 24 hours. The product is isolated by evaporation of the solvent. In many cases the product is extremely delinquescent and must be isolated and kept in a moisture-free environment.

It is desirable that the reaction be carried out under anhydrous conditions. The presence of water decreases the yield of product and inhibits purification. A convenient way in which to ensure water-free reaction conditions is to carry out the reaction in the presence of molecular sieves (Linde Size 5A). The reaction is preferably carried out in an atmosphere of dry nitrogen.

To obtain the halide anion comprising compound, as opposed to the hydrogen dihalide compound, the product of reaction (I) can be treated with an amine, e.g., triethylamine, to tie up hydrogen halide, and the triethylamine-hydrogen halide removed.

The triamido halophosphonium halide feed stock for the above-described reaction is prepared by the addition of 1 mole of molecular halogen, e.g., chlorine, bromine, or iodine, to 1 mole of a phosphorous triamide. This reaction is also carried out in an inert solvent, preferably the same solvent as is used in the subsequent reaction to produce the compounds of this invention. The quantity of solvent ranges from that which is sufficient to dissolve the reactants up to 10 times that much. This halogenation reaction is generally carried out at temperatures below 20° C., preferably in the range of 0° C. to 10° C. Halogen is added slowly to the phosphorous triamide dissolved in the desired solvent. The mode of halogen addition depends on the type of halogen, i.e., iodine is dissolved in a portion of the solvent before addition; bromine may be added neat, but preferably is dissolved in a portion of the solvent; chlorine is added as a gas, or it may be dissolved in and added with the solvent. The reaction is quite rapid and is essentially complete when all the halogen has been added. However, it is desirable to stir the reaction for ¼ to 1 hour after addition is complete to ensure complete reaction. Nitrogen gas may be passed through the reaction mixture during this latter period in order to remove any unreacted chlorine or bromine. The product of this reaction may be isolated by evaporation of the solvent but is preferably used as is; that is, in the solvent used, without any further workup.

The phosphorous triamides employed in the preparation of the triamido halophosphorium halides are well known and may be prepared by well known processes. Generally, the triamide is obtained by the reaction of phosphorus trichloride and an amine.

The subject invention will be more fully understood by reference to the following examples.

Example 1.—Hexa-n-propyltriamido phenoxy phosphonium hydrogen dibromide

A 500 ml. flask immersed in an ice-water bath was charged with 8.3 g. (0.025 mole) of N,N′,N″-hexa-n-propyl phosphoric triamide, 200 ml. of dichloromethane and 1 g. of Linde Type 5A molecular sieves. Then a solution of 4.0 g. (0.025 mole) of bromine in 50 ml. of dichloromethane was added slowly with stirring and while maintaining the temperature at about 10° C. After all the bromine was added, the mixture was allowed to warm to room temperature. During this time dry nitrogen was bubbled through the solution. Then 2.4 g. (0.025 mole) of phenol dissolved in 10 ml. of dichloromethane was added rapidly. The resulting mixture was stirred at reflux temperature for 8 hours. At the end of this time the solution was filtered, and the filtrate evaporated under vacuum to give 6.0 g. of a viscous oily product.

Analysis.—Calculated for $C_{24}H_{48}Br_2N_3OP$ (percent): Br, 27.3; P, 5.28. Found (percent): Br, 27.25; P, 5.18. An infrared spectra was consistent with the assigned structure and had strong absorption peaks at 6.85, 7.25–7.40, 8.4, 8.7, 9.25, 9.75, 13.25 and 14.4µ.

Example 2.—Hexa-n-propyltriamido 4-chlorophenylthio phosphonium hydrogen dibromide Bromination was carried out by essentially the same procedure as described for Example 1. Then 3.8 g. (0.025 mole) of p-chlorothiophenol dissolved in 50 ml. of dichloromethane was added rapidly, and the resulting mixture was refluxed for 16 hours. After filtering, the filtrate was evaporated to dryness under vacuum to give the 14 g. of an oily product.

Analysis.—Calculated for $C_{24}H_{47}Br_2ClN_3PS$: N, 6.6%; S, 5.1%; halogen, 4.7 meq./g. Found: N, 6.1%; S, 5.3%; halogen, 4.9 meq./g. An infrared spectra showed strong absorption at 6.8, 7.25, 8.3, 8.7, 9.15, 9.65, 12.2 and 13.45µ.

Other compounds were prepared according to the above procedure and are listed in Table I.

TABLE I

| Example number | Compound | Calculated | | | | Found | | | |
| --- | --- | --- | --- | --- | --- | --- | --- | --- | --- |
| | | N | P | S | Halogen [1] | N | P | S | Halogen [1] |
| 3 | Hexa-n-propyltriamido 2,4-dichlorophenoxy phosphonium hydrogen dibromide | | | | 13.9 | | | | 11.9 |
| 4 | Hexaethyl triamido 2,4-dichlorophenoxy phosphonium hydrogen dibromide | 7.4 | | | 7.0 | 7.1 | | | 7.0 |
| 5 | Hexa-n-butyltriamido phenoxy phosphonium hydrogen dibromide | 6.3 | | | 23.9 | 6.4 | | | 24.5 |
| 6 | Hexaethyl triamido phenoxy phosphonium hydrogen dibromide | 8.4 | | | 31.9 | 8.1 | | | 31.6 |
| 7 | Hexamethyl triamido phenoxy phosphonium hydrogen dibromide | | 7.4 | | 38.3 | | 7.6 | | 38.3 |
| 8 | Hexa-n-butyltriamido 4-chlorophenylthio phosphonium hydrogen dibromide | 5.8 | | 4.4 | 4.2 | 5.5 | | 4.5 | 4.2 |
| 9 | Hexa-n-butyltriamido 4-chlorophenoxy phosphonium hydrogen dibromide | | 4.4 | | 4.3 | | 4.4 | | 4.4 |
| 10 | Hexa-n-propyltriamido 4-chlorophenoxy phosphonium hydrogen dibromide | 6.7 | | | 4.8 | 5.7 | | | 5.2 |
| 11 | Hexaethyltriamido 4-chlorophenoxy phosphonium hydrogen dibromide | | 5.8 | | 5.6 | | 5.5 | | 5.6 |
| 12 | Hexamethyltriamido 4-chlorophenoxy phosphonium hydrogen dibromide | 9.3 | | | 6.7 | 9.8 | | | 6.8 |
| 13 | Hexa-n-propyltriamido phenylthio phosphonium hydrogen dibromide | 7.0 | 5.2 | 5.3 | | 6.5 | 5.0 | 6.5 | |
| 14 | Hexaethyltriamido phenylthio phosphonium hydrogen dibromide | 8.1 | | | 30.9 | 7.5 | | | 31.2 |
| 15 | Hexa-n-butyltriamido 2-methoxyphenoxy phosphonium hydrogen dibromide | 6.0 | | | 22.8 | 6.0 | | | 22.8 |
| 16 | Hexa-n-propyltriamido 2-methoxyphenoxy phosphonium hydrogen dibromide | 6.8 | | | 26.0 | 7.0 | | | 25.6 |
| 17 | Hexaethyltriamido 2-methoxyphenoxy phosphonium hydrogen dibromide | 7.9 | | | 30.1 | 8.4 | | | 28.2 |
| 18 | Hexa-n-butyltriamido 4-methoxyphenoxy phosphonium hydrogen dibromide | 6.0 | | | 22.8 | 6.0 | | | 21.9 |
| 19 | Hexa-n-propyltriamido 4-methoxyphenoxy phosphonium hydrogen dibromide | 6.8 | | | 26.0 | 7.1 | | | 25.7 |
| 20 | Hexaethyltriamido 4-methoxyphenoxy phosphonium hydrogen dibromide | 7.9 | | | 30.1 | 8.5 | | | 30.2 |
| 21 | Hexa-n-butyltriamido 3-phenoxyphenoxy phosphonium hydrogen dibromide | 5.5 | | | 21.0 | 5.9 | | | 20.4 |
| 22 | Hexa-n-propyltriamido 3-phenoxyphenoxy phosphonium hydrogen dibromide | 6.2 | | | 23.6 | 6.0 | | | 23.2 |
| 23 | Hexaethyltriamido 3-phenoxyphenoxy phosphonium hydrogen dibromide | 7.1 | | | 26.9 | 7.2 | | | 25.9 |
| 24 | Hexa-n-butytriamido 2-t-butylphenoxy phosphonium hydrogen dibromide | 5.8 | | | 22.0 | 5.9 | | | 21.2 |
| 25 | Hexa-n-propyltriamido 2-t-butylphenoxy phosphonium hydrogen dibromide | 6.6 | | | 24.9 | 7.0 | | | 22.7 |
| 26 | Hexa-n-butyltriamido 3-t-butylphenoxy phosphonium hydrogen dibromide | 5.8 | | | 22.0 | 6.1 | | | 22.3 |
| 27 | Hexa-n-butyltriamido pentachlorophenoxy phosphonium hydrogen dibromide | 5.0 | | | 8.3 | 5.2 | | | 8.3 |

See footnotes at end of table.

TABLE I—Continued

| Example number | Compound | Analysis Calculated | | | | Found | | | |
|---|---|---|---|---|---|---|---|---|---|
| | | N | P | S | Halogen[1] | N | P | S | Halogen[1] |
| 28 | Hexa-n-propyltriamido pentachlorophenoxy phosphonium hydrogen dibromide | 5.6 | | | 9.3 | 6.6 | | | 8.7 |
| 29 | Hexaethyltriamido pentachlorophenoxy phosphonium hydrogen dibromide | 6.2 | | | 10.4 | 5.8 | | | 10.4 |
| 30 | Hexa-n-butyltriamido 2-s-butylphenoxy phosphonium hydrogen dibromide | 5.8 | | | 22.1 | 5.8 | | | 22.6 |
| 31 | Hexa-n-propyltriamido 2-s-butylphenoxy phosphonium hydrogen dibromide | 6.6 | | | 34.9 | 6.6 | | | 25.0 |
| 32 | Hexa-n-butyltriamido 2,4-dimethylphenoxy phosphonium hydrogen dibromide | 6.1 | | | 22.9 | 6.4 | | | 23.6 |
| 33 | Hexa-n-propyltriamido 2,4-dimethylphenoxy phosphonium hydrogen dibromide | 6.9 | | | 26.1 | 6.7 | | | 26.1 |
| 34 | Hexaethyltriamido 2,4-dimethylphenoxy phosphonium hydrogen dibromide | 7.9 | | | 30.2 | 8.3 | | | 30.0 |
| 35 | Hexa-n-butyltriamido 4-bromophenoxy phosphonium hydrogen dibromide | 5.6 | | | 32.0 | 5.8 | | | 32.2 |
| 36 | Hexa-n-propyltriamido 4-bromophenoxy phosphonium hydrogen dibromide | 6.3 | | | 36.1 | 6.3 | | | 35.2 |
| 37 | Hexaethyltriamido 4-bromophenoxy phosphonium hydrogen dibromide | 7.2 | | | 41.3 | 6.5 | | | 40.0 |
| 38 | Hexa-n-butyltriamido 4-methylphenoxy phosphonium hydrogen dibromide | 6.2 | | | 23.4 | 6.2 | | | 23.5 |
| 39 | Hexa-n-propyltriamido 4-methylphenoxy phosphonium hydrogen dibromide | 7.0 | | | 26.7 | 6.7 | | | 27.0 |
| 40 | Hexaethyltriamido 4-methylphenoxy phosphonium hydrogen dibromide | 8.2 | | | 31.0 | 8.3 | | | 31.6 |
| 41 | Hexa-n-butyltriamido 2-methylphenylthio phosphonium hydrogen dibromide | 6.0 | | | 22.8 | 6.4 | | | 23.6 |
| 42 | Hexa-n-propyltriamido 2-methylphenylthio phosphonium hydrogen dibromide | 6.8 | | | 26.0 | 6.8 | | | 25.8 |
| 43 | Hexaethyltriamido 2-methylphenylthio phosphonium hydrogen dibromide | 7.9 | | | 30.1 | 8.6 | | | 30.0 |
| 44 | Hexa-n-butyltriamido 3-methylphenoxy phosphonium hydrogen dibromide | 6.2 | | | 23.4 | 6.2 | | | 24.5 |
| 45 | Hexa-n-propyltriamido 3-methylphenoxy phosphonium hydrogen dibromide | 7.0 | | | 26.7 | 7.2 | | | 27.0 |
| 46 | Hexaethyltriamido 3-methylphenoxy phosphonium hydrogen dibromide | 8.2 | | | 31.0 | 8.6 | | | 32.3 |
| 47 | Hexa-n-butyltriamido 4-methylphenylthio phosphonium hydrogen dibromide | 6.0 | | | 22.8 | 5.9 | | | 22.8 |
| 48 | Hexa-n-propyltriamido 4-methylphenylthio phosphonium hydrogen dibromide | 6.8 | | | 26.0 | 6.8 | | | 25.6 |
| 49 | Hexaethyltriamido 4-methylphenylthio phosphonium hydrogen dibromide | 7.9 | | | 30.1 | 7.8 | | | 29.5 |
| 50 | Hexa-n-butyltriamido 2,4-dichloro-5-methylphenoxy phosphonium hydrogen dibromide | 5.6 | | | 5.3 | 5.3 | | | 5.5 |
| 51 | Hexa-n-propyltriamido 2,4-dichloro-5-methylphenoxy phosphonium hydrogen dibromide | 6.3 | | | 6.0 | 6.1 | | | 6.0 |
| 52 | Hexaethyltriamido 2,4-dichloro-5-methylphenoxy phosphonium hydrogen dibromide | 7.2 | | | 6.9 | 6.6 | | | 6.9 |
| 53 | Hexa-n-propyltriamido 2-chlorophenoxy phosphonium hydrogen dibromide | 5.7 | | | 4.3 | 5.4 | | | 4.3 |
| 54 | Hexaethyltriamido 2-chlorophenoxy phosphonium hydrogen dibromide | 7.5 | | | 5.6 | 7.4 | | | 5.2 |
| 55 | Hexa-n-butyltriamido 3,4-dimethylphenoxy phosphonium hydrogen dibromide | 6.0 | | | 22.9 | 6.0 | | | 22.1 |
| 56 | Hexa-n-propyltriamido 3,4-dimethylphenoxy phosphonium hydrogen dibromide | 6.9 | | | 26.1 | 6.5 | | | 26.9 |
| 57 | Hexa-n-butyltriamido 4-bromophenylthio phosphonium hydrogen dibromide | 5.5 | | | 31.4 | 5.3 | | | 33.0 |
| 58 | Hexa-n-propyltriamido 4-bromophenylthio phosphonium hydrogen dibromide | 6.3 | | | 35.8 | 6.1 | | | 35.8 |
| 59 | Hexaethyltriamido 4-bromophenylthio phosphonium hydrogen dibromide | 7.1 | | | 40.2 | 6.5 | | | 42.0 |
| 60 | Hexa-n-butyltriamido 2,4-dichloro-6-methylphenoxy phosphonium hydrogen dibromide | 5.6 | | | 5.3 | 5.9 | | | 5.9 |
| 61 | Hexa-n-propyltriamido 2,4-dichloro-6-methylphenoxy phosphonium hydrogen dibromide | 6.3 | | | 6.0 | 6.0 | | | 6.2 |
| 62 | Hexaethyltriamido 2,4-dichloro-6-methylphenoxy phosphonium hydrogen dibromide | 7.2 | | | 6.9 | 6.0 | | | 7.1 |

[1] Halogen analysis expressed as percent for one type of halogen present or in meq./gram for more than one type of halogen present.

The compounds of this invention exhibit good herbicidal activity, particularly a post-emergence application. They are especially useful in the control of broadleaved weeds. For such use these compounds may be used in a solid, dust type formulation by dispersing them on a finely divided solid. An alternate way of utilizing these compounds is in a liquid formulation in which the active ingredient is employed as a constituent of a solvent solution. Such solutions may also contain dispersing, emulsifying or wetting agents, as well as other active or inert ingredients. Thus, in summary the herbicidal composition of this invention comprises a herbicidal amount of one or more of the above described compounds intimately admixed with a biologically inert carrier. The carrier may be a liquid diluent such as benzene or acetone or a solid. The solid may be in the form of dust, powder or granules. The composition may also contain other pesticides, stabilizers, conditioners, fillers and the like.

The amount of phosphonium compound administered will vary with the particular plant part or plant growth medium which is to be contacted, the general location of application, i.e. sheltered areas such as greenhouses as compared to exposed areas such as fields, as well as the desired type of control. For post emergent application, such as foliar spray application, compositions containing about 0.5 to 8 lbs. phosphonium compound per 100 gal. spray may be used. The application is equivalent to 0.5 to 20 lbs. phosphonium compound per acre.

Post-emergence test.—An acetone solution of the test phosphonium compound was prepared by mixing 750 mg. of phosphonium compound, 220 mg. of a nonionic surfactant and 25 ml. of acetone. This solution was added to approximately 125 ml. of water containing 156 mg. of surfactant. The concentration of the phosphonium compound in this formula was 500 p.p.m. This formulation was uniformly sprayed on 2 replicate pots of 24-day-old plants (approximately 15 to 25 plants per pot) at a dose of 100 mg. per cm.$^2$. After the plants had dried, they were placed in a greenhouse and then watered intermittently at their bases as needed. The plants were observed periodically for phytotoxic effects and physiological and morphological responses to the treatment. After 3 weeks the herbicidal effectiveness of the phosphonium compound was rated based on these observations. A 0 to 100 scale was used; 0 representing no phytotoxicity, 100 representing complete kill.

The results of these tests appear in Table II.

TABLE II

| Compound (example number) | Wild oats | Water-grass | Crab-grass | Mustard | Pig-weed | Lambs-quarter |
|---|---|---|---|---|---|---|
| 1 | 96 | 96 | 90 | 100 | 100 | 100 |
| 2 | 100 | 100 | 100 | 100 | 100 | 100 |
| 3 | | | | 100 | 100 | 100 |
| 4 | 96 | 100 | 100 | 100 | 100 | 100 |
| 5 | 100 | | | 100 | 100 | 100 |
| 6 | 100 | 100 | 100 | 100 | 100 | 100 |
| 7 | | | 22 | | | |
| 8 | 90 | 90 | 99 | 100 | 100 | 100 |
| 9 | 96 | 100 | 100 | 100 | 96 | 96 |
| 10 | 90 | 90 | | 100 | 100 | 100 |
| 11 | 90 | 100 | 100 | 100 | 100 | 100 |
| 12 | | | | 100 | 100 | 100 |
| 13 | 100 | 100 | | 100 | 100 | 100 |
| 14 | 100 | | 100 | 100 | 100 | 100 |
| 15 | 100 | | 100 | 100 | 100 | 100 |
| 16 | 100 | | 100 | 100 | 100 | 100 |
| 17 | 100 | | 100 | 100 | 100 | 100 |
| 18 | 100 | | 100 | 100 | 100 | 100 |
| 19 | | | 90 | 100 | 100 | 100 |
| 20 | 100 | | 100 | 100 | 100 | 100 |
| 21 | 100 | | | 100 | 100 | 100 |
| 22 | 100 | | | 100 | 100 | 100 |
| 23 | 100 | | | 100 | 100 | 100 |
| 24 | 96 | 90 | 96 | 100 | 100 | 100 |
| 25 | 100 | | | 100 | 100 | 100 |
| 26 | 96 | 90 | 90 | 100 | 100 | 100 |
| 27 | 99 | 96 | 99 | 100 | 100 | 100 |
| 28 | 100 | 100 | 100 | 100 | 100 | 100 |
| 29 | | | 90 | 100 | 100 | 100 |
| 30 | 90 | | 90 | | 100 | 100 |
| 31 | | | | 90 | 100 | 100 |
| 32 | 100 | 100 | 100 | 100 | 100 | |
| 33 | 100 | 100 | 100 | 100 | 100 | |
| 34 | 100 | 96 | | 100 | 100 | |
| 35 | 100 | 100 | 100 | 100 | 100 | |
| 36 | 100 | 100 | 100 | 100 | 100 | |
| 37 | 100 | 100 | 100 | 100 | 100 | |
| 38 | 100 | 99 | 100 | 100 | 100 | |
| 39 | 100 | 100 | 100 | 100 | 100 | |
| 40 | 100 | 100 | 100 | 100 | 100 | |
| 41 | 99 | | | 100 | 100 | |
| 42 | 90 | | | 100 | 100 | |
| 43 | 100 | | | 100 | 100 | |
| 44 | 100 | 100 | 100 | 100 | 100 | 100 |

TABLE II (Continued)

| Compound (example number) | Wild oats | Water-grass | Crab-grass | Mustard | Pig-weed | Lambs-quarter |
|---|---|---|---|---|---|---|
| 45 | 100 | 100 | 100 | 100 | 100 | |
| 46 | 100 | 100 | 100 | 100 | 100 | |
| 47 | 100 | 90 | 100 | 100 | 100 | 100 |
| 48 | 100 | 85 | 95 | 100 | 100 | 100 |
| 49 | | | 80 | 100 | 100 | 100 |
| 50 | 100 | 85 | 95 | 100 | 100 | 90 |
| 51 | | 95 | 100 | 100 | 100 | 100 |
| 52 | | | 90 | 98 | 100 | 100 |
| 53 | 100 | | 98 | 100 | 100 | 95 |
| 54 | | | | 100 | 100 | 100 |
| 55 | 100 | 95 | 100 | 100 | 100 | 100 |
| 56 | 80 | | 98 | 100 | 100 | 100 |
| 57 | 90 | | 96 | 100 | 100 | 100 |
| 58 | 100 | 100 | 100 | 100 | 100 | 100 |
| 59 | | | | 100 | 100 | 100 |
| 60 | 100 | 100 | 100 | 100 | 100 | 100 |
| 61 | 100 | 100 | 100 | 100 | 100 | 100 |
| 62 | 100 | 100 | 100 | 100 | 100 | 100 |

NOTE.—Wild oats (*Avena fatua*): Watergrass (*Echinochloa crusgalli*): Crabgrass (*Digitaria sanguinalis*): Mustard (*Brassica arvensis*): Pigweed (*Amaranthus retroflexus*): Lambsquarter (*Chenopodium album*).

Many of the compounds of the present invention exhibited fungicidal activity. In particular those compounds wherein $R_1$, $R_2$, $R_3$, $R_4$, $R_5$ and $R_6$ individually contain at least 3 carbon atoms have excellent fungicidal activity.

When used as fungicides the phosphonium compounds of this invention will be formulated and applied in fungicidal amounts by conventional art methods to fungi or hosts which are subject to fungus attack, especially vegetative hosts such as plants, plant seeds, etc. The amount used will, of course, depend upon several factors such as the host, the type of fungus, the particular phosphonium compound, etc. The phosphonium compounds may be combined with inert liquids or solid carriers as powders, solutions, dispersions, etc. for such use.

The phosphonium compounds of this invention will generally be admixed with biologically inert liquids or solids in an amount of from about 0.005 to 95 weight percent. Higher or lower amounts can be used to advantage. Preferably from 1 to 50 weight percent of the composition will be the phosphonium compound. Typical of the liquid carrier which may be admixed with the phosphonium compounds of this invention include, in addition to acetone, such liquids as benzene, xylene, alcohols, alkylated naphthylene and glycols. Typical solids which may be incorporated with the phosphonium compounds include the natural clays, such as kaolin clays, diatomaceous earth, synthetic fine silica, talc, pyrophyllite, etc.

Fungicidal formulations may also contain stabilizers, spreading agents, sticking agents, fillers, other compatible pesticides and the like.

To exhibit the fungicidal activity of the compounds of the present invention, the following test was made.

Example

A number of the inventive compounds were evaluated for fungicidal effectiveness by means of the mycelial drop test. This test is designed to measure the fungitoxic activity of fungicidal chemicals in terms of their degree of inhibition on mycelium growth. Each compound to be tested was dissolved in acetone at 10 p.p.m. concentration. Paper discs previously inoculated with equal amounts of particular fungus mycelium were placed on potato dextrose agar medium. The paper discs were treated by applying a precise and equal volume of each of these fungicidal solutions to the center. Following treatment with the fungitoxic chemical, the discs were incubated along with inoculated but untreated control discs at ambient temperatures until such time that these untreated control discs were filled to a certain level with mycelial growth away from the edge of the disc in treated and untreated samples. From this comparison a percent inhibition of growth area was determined. The results of these tests for various compounds of this invention on the particular fungus mycelium are indicated in Table III.

TABLE III

| Example number: | Monilinia | Alternaria |
|---|---|---|
| 1 | 100 | 96 |
| 2 | 100 | 40 |
| 5 | 100 | 100 |
| 8 | 100 | 100 |
| 9 | 100 | 100 |
| 10 | 100 | 99 |
| 13 | 100 | 78 |
| 15 | 100 | 100 |
| 16 | 78 | 78 |
| 18 | 100 | 100 |
| 19 | 100 | 99 |
| 21 | 100 | 100 |
| 24 | 100 | 100 |
| 26 | 100 | 100 |
| 27 | 100 | 100 |
| 28 | 100 | 22 |
| 30 | 100 | 100 |
| 31 | 100 | 100 |
| 32 | 100 | |
| 33 | 100 | |
| 36 | 100 | |
| 38 | 100 | |
| 39 | 100 | |
| 41 | 100 | |
| 42 | 100 | |
| 44 | 100 | 90 |
| 45 | 100 | |
| 47 | 100 | 10 |
| 48 | 100 | 99 |
| 50 | 51 | 99 |
| 51 | 100 | 99 |
| 53 | 100 | 100 |
| 55 | 100 | 100 |
| 56 | 100 | 100 |
| 57 | 100 | 100 |
| 58 | 100 | 100 |
| 60 | 100 | 100 |
| 61 | 100 | 50 |

NOTE.—Monilinia (*Monilinia fructicola*); Alternaria (*Alternaria solani*).

In addition to herbicidal and fungicidal activity, many of the compounds of this invention also have excellent defoliating properties. Thus, when cotton, ready for harvesting, is treated with a solution having from 500 to 5000 p.p.m. of these compounds, the leaves dry up and fall from the plant. Then the cotton bolls may be easily harvested. Examination of the boll shows no staining or other effect from the defoliating composition. The compounds preferred for this use are those in which $R_1$, $R_2$, $R_3$, $R_4$ $R_5$ and $R_6$ are n-propyl, Y is O or S, Z is an anion containing bromine or chlorine, and R is phenyl, substituted with 0 to 5 methyl groups. The most preferred compounds are hexa-n-propyltriamido 2-methyl-phenyl-thio phosphonium hydrogen dibromide and hexa-n-propyltriamido 3-methylphenoxy phosphonium hydrogen dibromide.

As will be evident to those skilled in the art, various modifications on this invention can be made or followed, in the light of the foregoing disclosure and discussion, without departing from the spirit or scope of the disclosure or from the scope of the following claims.

I claim:

1. Compounds of the formula

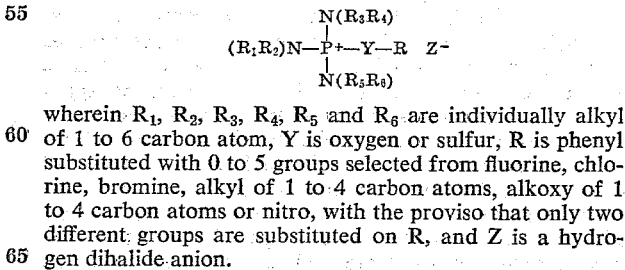

wherein $R_1$, $R_2$, $R_3$, $R_4$, $R_5$ and $R_6$ are individually alkyl of 1 to 6 carbon atom, Y is oxygen or sulfur, R is phenyl substituted with 0 to 5 groups selected from fluorine, chlorine, bromine, alkyl of 1 to 4 carbon atoms, alkoxy of 1 to 4 carbon atoms or nitro, with the proviso that only two different groups are substituted on R, and Z is a hydrogen dihalide anion.

2. The compound of claim 1 wherein $R_1$, $R_2$, $R_3$, $R_4$, $R_5$ and $R_6$ are the same.

3. The compound of claim 2 wherein $R_1$, $R_2$, $R_3$, $R_4$, $R_5$ and $R_6$ are the same.

4. The compound of claim 3 wherein $R_1$, $R_2$, $R_3$, $R_4$, $R_5$ and $R_6$ are n-propyl or n-butyl.

5. The compound of claim 1 wherein R is phenyl substituted with 0 to 5 alkyl or 1 to 4 carbon atoms.

6. The compound of claim 1 wherein R is phenyl substituted with 0 to 5 fluorine, chlorine or bromine atoms.

7. The compound of claim 1 wherein Z is hydrogen dichloride or dibromide anion.

8. The compound of claim 1 being hexa-n-propyltriamido 2-methylphenylthio phosphonium hydrogen dibromide.

9. The compound of claim 1 being hexa-n-propyltriamido 3-methylphenoxy phosphonium hydrogen dibromide.

10. The compound of claim 1 wherein R is phenyl substituted with 0 to 5 fluorine, chlorine, bromine or alkyl groups, 0 to 5 alkoxy groups or 0 to 5 nitro groups.

11. The compound of claim 1 wherein Y is oxygen.

12. The method of preparing compounds of the formula

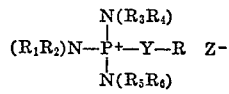

wherein $R_1$, $R_2$, $R_3$, $R_4$, $R_5$ and $R_6$ are individually alkyl of 1 to 6 carbon atoms, Y is oxygen or sulfur, R is phenyl substituted with 0 to 5 groups selected from fluorine, chlorine, bromine, alkyl of 1 to 4 carbon atoms, alkoxy of 1 to 4 carbon atoms or nitro, with the proviso that only two different groups are substituted on R, and Z is a hydrogen dihalide anion, by reacting a triamido halophosphonium halide of the formula

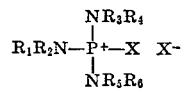

wherein $R_1$, $R_2$, $R_3$, $R_4$, $R_5$ and $R_6$ have the same meaning as described above and X represents a halogen of atomic number 17 to 53, with a phenol or thiophenol of the formula

wherein R and Y have the same meaning as described above at temperatures in the range of from 20° C. to the reflux temperature of the reaction mixture and in the presence of an inert solvent.

13. The process of claim 12 wherein $R_1$, $R_2$, $R_3$, $R_4$, $R_5$ and $R_6$ are n-alkyl of 1 to 4 carbon atoms.

14. The process of claim 13 wherein R is phenyl substituted with 0 to 5 alkyl of 1 to 4 carbon atoms.

15. The process of claim 13 wherein R is phenyl substituted with 0 to 5 fluorine, chlorine or bromine atoms.

16. The process of claim 13 wherein $R_1$, $R_2$, $R_3$, $R_4$, $R_5$ and $R_6$ are the same.

17. The process of claim 16 wherein $R_1$, $R_2$, $R_3$, $R_4$, $R_5$ and $R_6$ are n-propyl or n-butyl.

18. The process of claim 14 wherein the reaction is carried out under anhydrous conditions.

19. The process of claim 12 wherein Z is hydrogen dibromide or hydrogen dichloride anion.

References Cited
UNITED STATES PATENTS 3,074,993  1/1963  Tolkmith _____ 260—959 X LEWIS GOTTS, Primary Examiner A. H. SUTTO, Assistant Examiner U.S. Cl. X.R.

71—71, 86, 87; 260—951, 973; 424—217, 220

PO-1050
(5/69)

UNITED STATES PATENT OFFICE
CERTIFICATE OF CORRECTION

Patent No. 3,755,510   Dated August 28, 1973

Inventor(s)   DAVID CHEONG KING CHAN

It is certified that error appears in the above-identified patent and that said Letters Patent are hereby corrected as shown below:

Col. 6, Example 29, last column, "10.4" should read --10.6--.

Col. 6, Example 30, last column, "22.6" should read --22.4--.

Col. 8, line 31, "*solaai*" should read --*solani*--.

Col. 10, line 19, Claim 18 should be dependent on Claim 12.

Signed and sealed this 17th day of September 1974.

(SEAL)
Attest:

McCOY M. GIBSON, JR.
Attesting Officer

C. MARSHALL DANN
Commissioner of Patents

PO-1050
(5/69)

UNITED STATES PATENT OFFICE
CERTIFICATE OF CORRECTION

Patent No. 3,755,510            Dated August 28, 1973

Inventor(s) DAVID CHEONG KING CHAN

It is certified that error appears in the above-identified patent and that said Letters Patent are hereby corrected as shown below:

Col. 8, lines 66-67, Claim 2 should read --The compound of Claim 1 wherein $R_1$, $R_2$, $R_3$, $R_4$, $R_5$ and $R_6$ are individually n-alkyl of 1 to 4 carbon atoms.--

Signed and sealed this 20th day of May 1975.

(SEAL)
Attest:

RUTH C. MASON
Attesting Officer

C. MARSHALL DANN
Commissioner of Patents
and Trademarks